United States Patent
Tanaka

(10) Patent No.: US 10,155,418 B2
(45) Date of Patent: Dec. 18, 2018

(54) HEAVY DUTY PNEUMATIC TIRE

(71) Applicant: Sumitomo Rubber Industries, Ltd., Kobe-shi, Hyogo (JP)

(72) Inventor: Kaori Tanaka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 97 days.

(21) Appl. No.: 15/203,338

(22) Filed: Jul. 6, 2016

(65) Prior Publication Data

US 2017/0028791 A1    Feb. 2, 2017

(30) Foreign Application Priority Data

Jul. 28, 2015 (JP) .................... 2015-148717

(51) Int. Cl.
 *B60C 11/04* (2006.01)
 *B60C 11/13* (2006.01)
 *B60C 11/03* (2006.01)

(52) U.S. Cl.
 CPC ........ *B60C 11/047* (2013.01); *B60C 11/0309* (2013.01); *B60C 11/1315* (2013.01); *B60C 11/1323* (2013.01); *B60C 2011/0346* (2013.01); *B60C 2011/0353* (2013.01); *B60C 2011/0355* (2013.01); *B60C 2011/0365* (2013.01); *B60C 2011/0367* (2013.01); *B60C 2200/06* (2013.01)

(58) Field of Classification Search
 CPC ............... B60C 2011/0341–2011/0355; B60C 2011/0374–2011/0379
 See application file for complete search history.

(56) References Cited

U.S. PATENT DOCUMENTS 4,630,661 A * 12/1986 Stelzer ............... B60C 11/0309
 152/209.21
4,703,788 A * 11/1987 Kusube ............... B60C 11/0309
 152/209.21
4,854,358 A * 8/1989 Takeuchi ............... B60C 11/00
 152/209.18

(Continued)

FOREIGN PATENT DOCUMENTS

GB          1203891 A  *  9/1970 ......... B60C 11/0306
JP    2008-296795 A1    12/2008
JP    2011037315 A  *  2/2011

*Primary Examiner* — Jodi C Franklin
(74) *Attorney, Agent, or Firm* — Birch, Stewart, Kolasch & Birch, LLP

(57) ABSTRACT

A heavy duty pneumatic tire includes a tread portion provided with a zigzag central main groove having zigzag pitches of from 40 to 50. The central main groove includes a bottom and a pair of groove walls. Each groove wall includes a bottom side steep sloped portion and a top side gentle sloped portion. The steep sloped portion includes a height of from 10% to 35% of a depth of the central main groove and an angle of from 0 to 10 degrees with respect to a tire normal line of a tread ground-contact surface. The gentle sloped portion extends radially outwardly from the steep sloped portion. Each groove wall includes an internal corner protruding and an external corner, and the angle of the gentle sloped portion decreases in a range of from 15 to 25 degrees from the internal corner toward the external corner.

8 Claims, 6 Drawing Sheets

(56) References Cited

U.S. PATENT DOCUMENTS

| | | | | |
|---|---|---|---|---|
| 4,955,415 A | * | 9/1990 | Takeuchi | B60C 11/0309 |
| | | | | 152/209.21 |
| 6,220,320 B1 | * | 4/2001 | Nakagawa | B60C 11/0302 |
| | | | | 152/209.11 |
| 2002/0100525 A1 | * | 8/2002 | Takubo | B60C 11/0309 |
| | | | | 152/209.8 |
| 2006/0130950 A1 | * | 6/2006 | Murata | B60C 11/0302 |
| | | | | 152/209.24 |
| 2011/0308676 A1 | * | 12/2011 | Morozumi | B60C 11/032 |
| | | | | 152/153 |
| 2014/0137998 A1 | * | 5/2014 | Tanabe | B60C 11/1392 |
| | | | | 152/209.8 |

* cited by examiner

HEAVY DUTY PNEUMATIC TIRE

BACKGROUND ART

Field of the Invention

The present invention relates to heavy duty pneumatic tires, and in particular to a heavy duty pneumatic tire capable of reducing stone-biting while ensuring drainage performance.

Description of the Related Art

In order to provide drainage performance, a pneumatic tire includes a tread portion provided with at least one main groove with a relatively wide width. In the meantime, when the tire travels on unpaved road around a construction site and the like, the main groove tends to pinch a stone on the road and hold it for a while (it is hereinafter referred to simply as "stone-biting"). The stone-biting tends to occur more easily on heavy duty pneumatic tires having a deep main-groove which is subject to a large ground-contact pressure, and it causes damage on the bottom of the main groove such as crack or chipping.

In order to prevent the stone-biting, Japanese Unexamined Patent Application Publication No. 2008-296795 discloses a tire (t) including a main groove (g) with a bottom (s) provided with a plurality of projections (a) for preventing stone-biting which are spaced in the longitudinal direction of the tire and are separated from both groove walls (h) has been proposed, as illustrated in FIG. 6. These projection (a) can elastically be compressed at the time the main groove (g) has pinched a stone, and then projections (a) can push the stone away from the main groove (g) using the restoring force to reduce stone-biting.

Unfortunately, the projections (a) may deform in contact with the groove walls (h) which narrowed when the main groove comes (g) into contact with the ground, and thus these projections (a) cannot prevent the stone-biting. Furthermore, the projections (a) may bring deterioration of drainage performance of the tire due to reduction of groove volume of the main groove (a).

SUMMARY OF THE INVENTION

In view of the above problems in the conventional art, the present invention has an object to provide a heavy duty pneumatic tire capable of reducing stone-biting while ensuring drainage performance.

According to one aspect of the invention, a heavy duty pneumatic tire includes a tread portion including a central region having a 10% width of a tread width centered on a tire equator. The central region is provided with at least one circumferentially and continuously extending zigzag central main groove having zigzag pitches of from 40 to 50. The at least one central main groove includes a bottom and a pair of groove walls. Each groove wall includes a bottom side steep sloped portion and a top side gentle sloped portion. The steep sloped portion includes a height of from 10% to 35% of a groove depth of the central main groove from the bottom and an angle of from 0 to 10 degrees with respect to a tire normal line of a tread ground-contact surface. The gentle sloped portion extends from the steep sloped portion toward the tread ground-contact surface with an angle greater than that of the steep sloped portion. The central main groove has a groove width of from 4.0 to 12.0 mm between the steep sloped portions. Each groove wall includes an internal corner protruding toward a groove centerline of the central main groove and an external corner protruding an opposite direction to the center line. The angle of the gentle sloped portion decreases in a range of from 15 to 25 degrees from the internal corner toward the external corner.

In another aspect of the invention, preferably, the groove width between the steep sloped portions may be in a range of from 50% to 200% of the height of the steep sloped portion.

In another aspect of the invention, preferably, the steep sloped portion may include a top edge including arc shaped portions formed on the internal corner and the external corner, and a straight shaped portion connecting the arc shaped portions.

In another aspect of the invention, preferably, the tread portion may be further provided with a central lateral groove extending from the external corner of the central main groove toward a tread edge with an angle of from 10 to 40 degrees with respect to an axial direction of the tire.

In another aspect of the invention, preferably, the tread portion may be further provided with a circumferentially and continuously extending shoulder main groove adjacent to the central main groove, and the central lateral groove may be in communication with the shoulder main groove.

DESCRIPTION OF THE PREFERRED EMBODIMENTS

Figure 1:
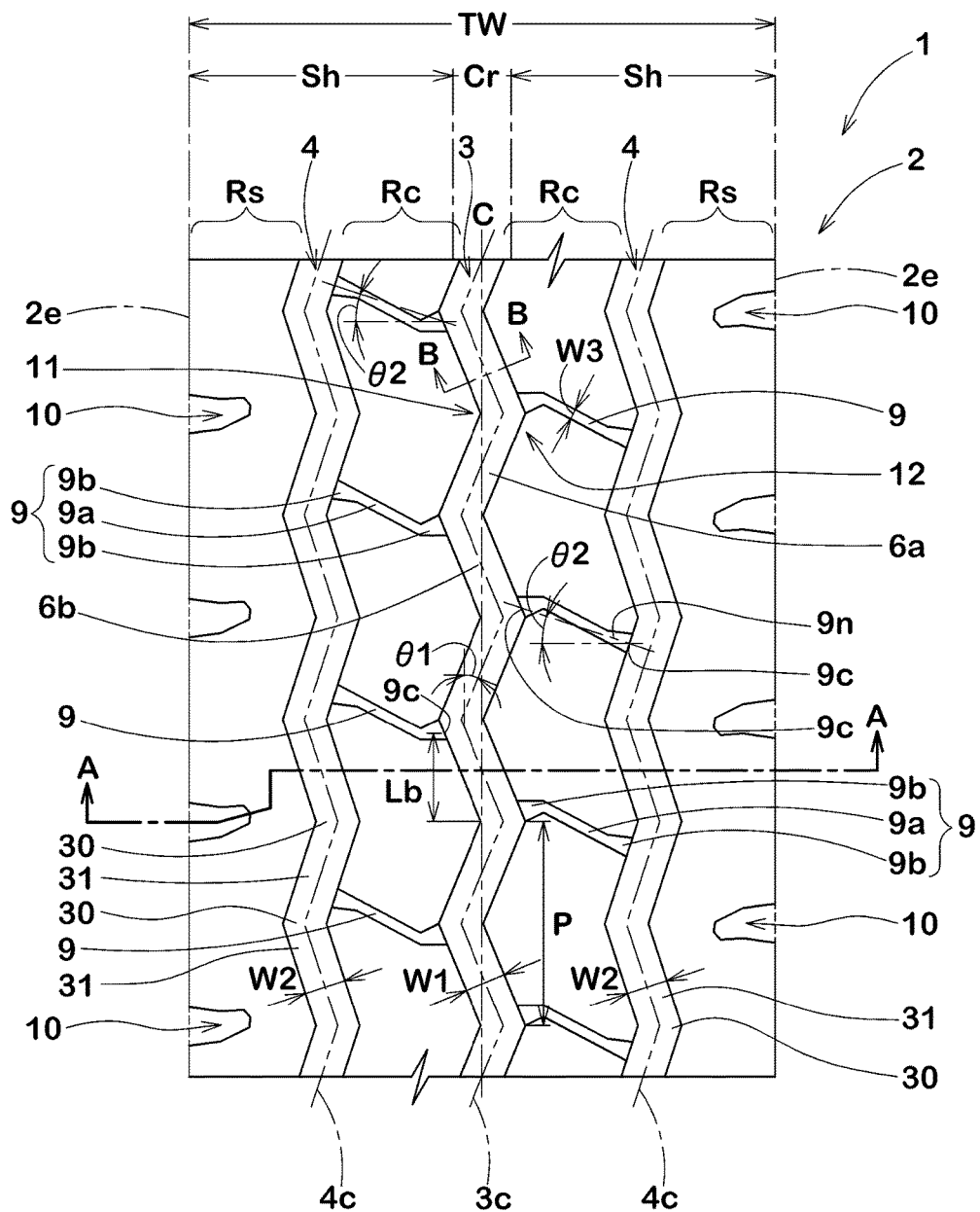
FIG. 1 is a development view of a tread portion of a heavy duty pneumatic tire according to an embodiment of the present invention.

An embodiment of the present invention will be explained below with reference to the accompanying drawings. As illustrated in FIG. 1, a heavy duty pneumatic tire (hereinafter, it referred to as "tire") 1 includes a tread portion 2 which is imaginary divided into a central region Cr and a pair of shoulder regions Sh and Sh located axially both sides of the central region Cr. The central region Cr is a region having a 10% width of a tread width TW centered on a tire equator C.

The tread width TW is defined as an axial distance between the tread edge 2e and 2e under a normally inflated unloaded condition such that the tire 1 is mounted on a standard wheel rim with a standard pressure, but is loaded with no tire load.

As used herein, each tread edge 2e is defined as the edge if it is obviously identified in appearance. However, if impossible, the tread edges 2e are defined as the axially outermost edges of the ground contacting patch of the tread portion 2 which occurs under a normally inflated loaded condition when the camber angle of the tire 1 is zero. The normally inflated loaded condition is such that the tire 1 is mounted on a standard wheel rim with a standard pressure, and is loaded with a standard tire load.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

Unless otherwise noted, dimensions of respective portions of the tire are values specified in the normally inflated unloaded condition.

The tread portion 2 is provided with at least one central main groove 3 and at least one shoulder main groove 4. In this embodiment, a single central main groove 3 is provided in the central region Cr. The central main groove 3 extends continuously in a zigzag shape in a circumferential direction of the tire. In this embodiment, a single shoulder main groove 4 is provided in each shoulder region Sh so as to be adjacent to the central main groove 3. Each shoulder main groove 4 extends continuously in a zigzag shape in the circumferential direction of the tire.

The tread portion 2 is separated into a pair of central land portions Rc each of which is formed between the central main groove 3 and one of the shoulder main grooves 4, and a pair of shoulder land portions Rs each of which is formed between the shoulder main groove 4 and the tread edge 2e on each side of the tire equator C.

In the definition when determining whether a main groove 3 or 4 belongs to the central region Cr or the shoulder region Sh, a location of an amplitude center of a zigzag centerline 3c or 4c of the central main groove 3 or the shoulder main groove 4 respectively serves as the reference.

The central land portion Rc is provided with a plurality of central lateral grooves 9 connecting the central main groove 3 and the shoulder main groove 4 and being spaced in the circumferential direction of the tire. Thus, the central land portion Rc is configured as a row of blocks. Furthermore, each shoulder land portion Rs is provided with a plurality of lug grooves 10 extending axially inwardly from the tread edge 2e and terminating without reaching the shoulder main groove 4. Thus, each shoulder land portion Rs is configured as a rib being continuous in the circumferential direction of the tire.

Figure 2:
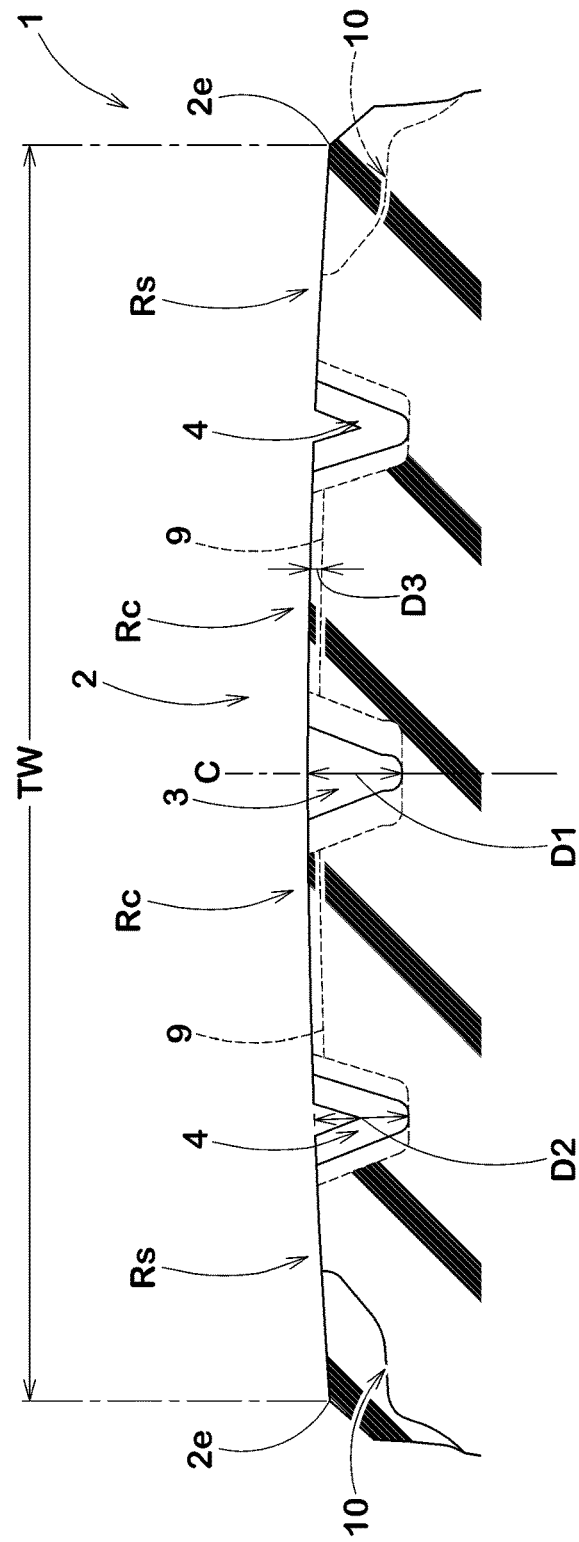
FIG. 2 is a cross-sectional view taken along a line A-A of FIG. 1.

As illustrated in FIGS. 1 and 2, the central main groove 3 and the shoulder main grooves 4, for example, have groove widths W1 and W2 perpendicular to the respective groove centerlines 3c and 4c being in a range of from about 4% to 10% of the tread width TW, and groove depth D1 and D2 of from about 14 to 20 mm. This configuration would be helpful to improve drainage performance of the tire while ensuring pattern rigidity of the tread portion 2. Note that the central main groove 3 may be same as or different from the shoulder main groove 4, regarding the groove width and depth.

The central main groove 3 according to the present embodiment is disposed in the central region Cr, and thus water on the road may be easily dispersed from around the tire equator C of the tread portion 2 to improve drainage performance.

In this embodiment, the central main groove 3 includes a first inclined portion 6a and a second inclined portion 6b which are arranged alternately in the circumferential direction of the tire. The first inclined portion 6a inclines in a direction (e.g., downward to the left) with respect to the circumferential direction of the tire. The second inclined portion 6b is connected to the first inclined portion 6a and inclines in an opposite direction (e.g., downward to the right) to the first inclined portion 6a. Such a central main groove 3 may be useful to increase traction and braking force using its lateral component edges. When an angle $\theta1$ of each inclined portion 6a and 6b with respect to the circumferential direction of the tire is excessively large, drainage performance of the tire may be deteriorated due to high flowing water resistance. Thus, the angle $\theta1$ is preferably 10 degrees or more, further preferably 15 degrees or more, but preferably 40 degrees or less, further preferably 35 degrees or less.

The central main groove 3 includes zigzag pitches of from 40 to 50. When the number of pitches is less than 40, traction and braking force may be lowered. On the other hand, when the number of pitches is more than 50, it can be difficult to suppress stone-biting as well as to maintain drainage performance of the tire. From these points of view, the number of pitches is preferably 42 or more and preferably 48 or less. It is not particularly limited, but each length P of pitches is about 20% to 50% of the tread width TW.

Figure 3:
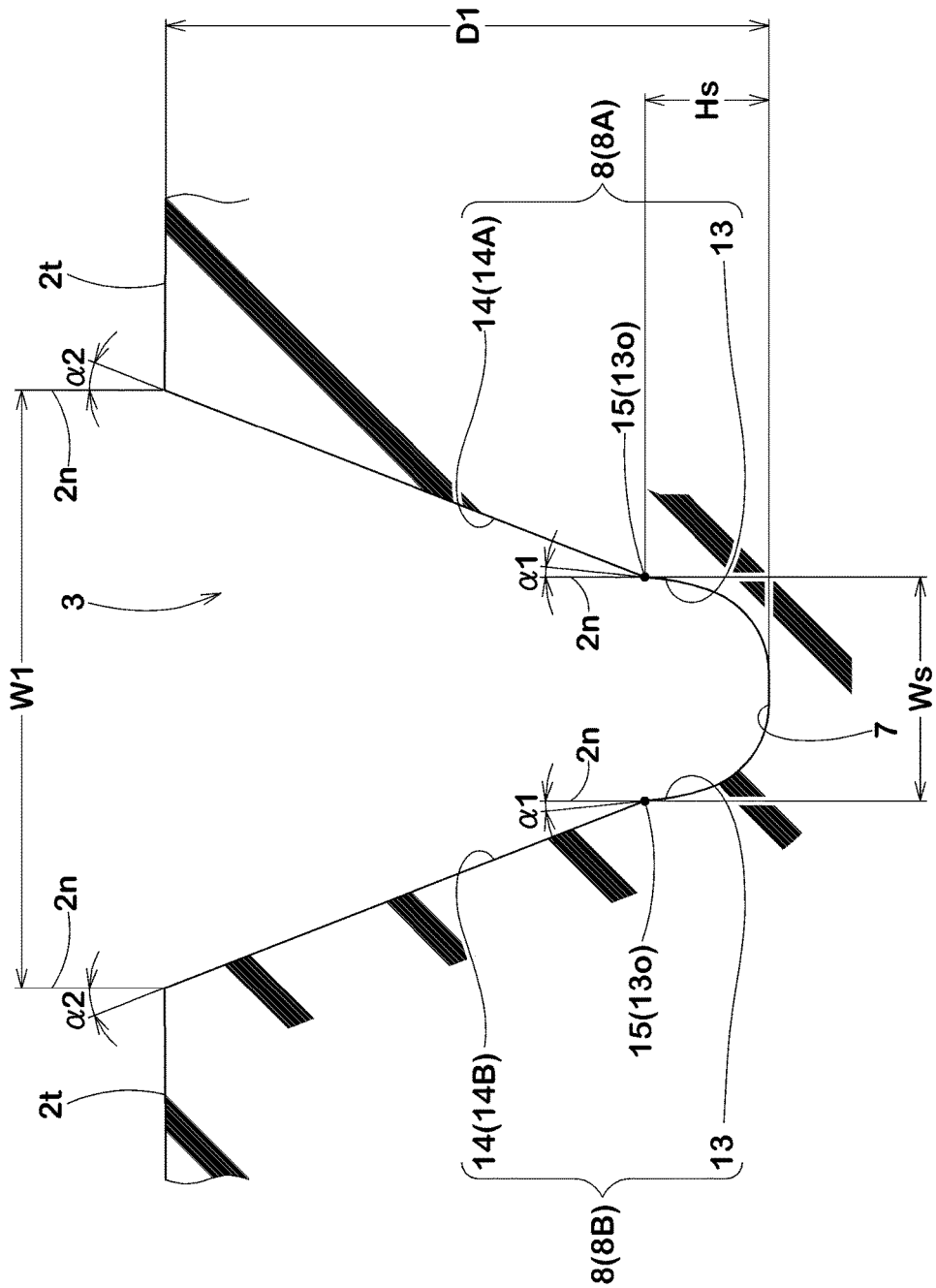
FIG. 3 is a cross-sectional view taken along a line B-B of FIG. 1.

FIG. 3 illustrates a cross-sectional view taken along a line B-B of FIG. 1. As illustrated in FIG. 3, the central main groove 3 includes a bottom 7 and a pair of groove walls 8 extending from the bottom 7 to a tread ground-contact surface 2t, in a cross section perpendicular to a longitudinal direction of the groove.

Figure 4:
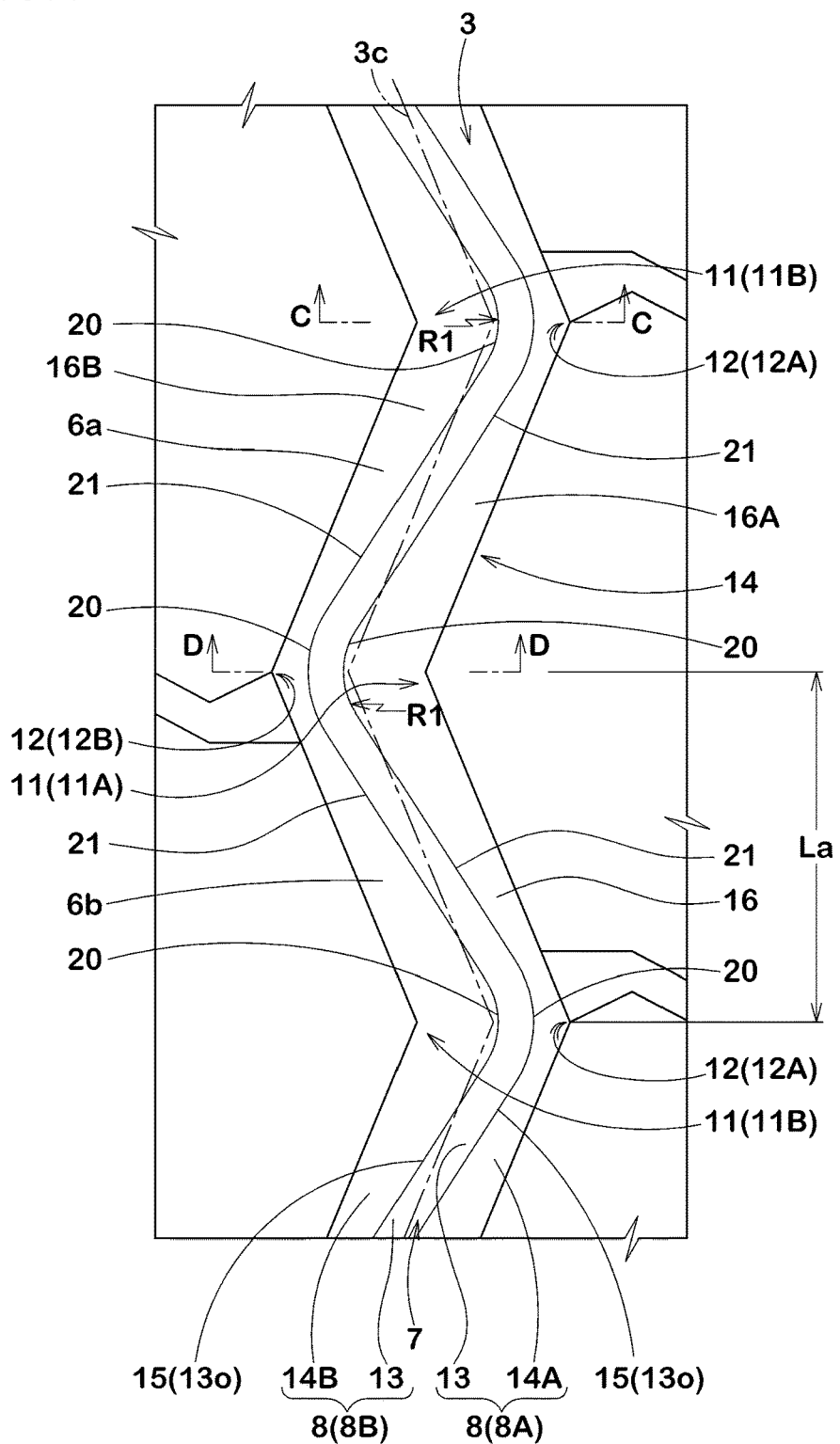
FIG. 4 is an enlarged view of a central main groove.

Each of the groove walls 8, as illustrated in FIG. 4, includes internal corners 11 protruding toward the groove centerline 3c of the central main groove 3 and external corners 12 protruding an opposite direction to the center line 3c. In this embodiment, in FIG. 4, each internal corner 11A of the right side groove wall 8A is axially adjacent to each external corner 12B of the left side groove wall 8B. Furthermore, each external corner 12A of the right side groove wall 8A is axially adjacent to each internal corner 11B of the left side groove wall 8B.

As illustrated in FIG. 3, each of the groove walls 8 includes a bottom side steep sloped portion 13 extending radially outwardly from the bottom 7 and a top side gentle sloped portion 14 extending from a radially outer end 13o of the steep sloped portion 13 to the tread ground-contact surface 2t. The gentle sloped portion 14 has an angle $\alpha2$ greater than an angle $\alpha1$ of the steep sloped portion 13. The gentle sloped portions 14 with a relatively large angle $\alpha2$ can reduce a contact area and holding force with respect to the stone that is pinched therebetween so that the stone removes easily from the groove. Furthermore, the gentle sloped portions 14 may be useful to enlarge a groove volume of the central main groove 3 to improve drainage performance of the tire. In addition, the steep sloped portions 13 with a relative small angle $\alpha1$, particularly the outer ends 13o, can prevent a stone entering therebetween, and thus damage such as crack and chipping on the bottom 7 can be suppressed. Note that the respective angles $\alpha1$ and $\alpha2$ are angles with respect to a tire normal line 2n perpendicular to the tread ground-contact surface 2t.

In this embodiment, the steep sloped portions 13, in the cross-section as illustrated in FIG. 3, extends in an arc shape from the bottom 7 to maintain sufficient rigidity of the bottom 7 in order to further suppress the damage such as crack and chipping.

Each steep sloped portion 13 has the angle α1 at the radially outer end 13o in a range of from 0 to 10 degrees. When the angle α1 is excessively small (i.e., the steep sloped portions incline toward the groove center line 3c so that the groove width decreases radially outwardly), rigidity of the radially outer ends 13o of steep sloped portions 13 tends to decrease, and thus crack or chipping tends to occur thereon. On the other hand, when the angle α1 is excessively large, a stone may reach the bottom 7 easily. In view of the above, the angle α1 is preferably 1 degree or more, and 8 degrees or less.

The steep sloped portions 13 have a height Hs in a range of from 10% to 35% of a groove depth D1 of the central main groove 3. When the height Hs is less than 10% of the groove depth D1, it can be difficult to suppress damage on the bottom 7 since a small stone is easily in contact with the bottom 7. On the other hand, when the height Hs is more than 35% of the groove depth D1, drainage performance of the tire may be deteriorated since the groove volume of the central main groove 3 becomes excessively small. In view of the above, the height Hs of the steep sloped portions 13 relative to the groove depth D1 is preferably 15% or more, further preferably 20% or more, and preferably 30% or less, further preferably 25% or less.

The groove width Ws between the steep sloped portions 13 is set in a range of from 4.0 to 12.0 mm. When the groove width Ws is less than 4.0 mm, it can be difficult to suppress crack and chipping since rigidity of the bottom 7 reduces. When the groove width Ws is more than 12.0 mm, a small stone reaches the bottom 7 easily. In view of the above, the groove width Ws is preferably 6.0 mm or more, and preferably 10.0 mm or less.

In order to further improve the effects as described above, the groove widths Ws between the steep sloped portions 13 relative to the height Hs of the steep sloped portions 13 is preferably 50% or more, further preferably 75% or more, and preferably 200% or less, further preferably 125% or less.

As illustrated in FIG. 4, the steep sloped portions 13 in accordance with the present embodiment includes a top edge 15 including arc shaped portions 20 formed on the internal corners 11 and the external corners 12, and straight shaped portions 21 connecting the arc shaped portions 20. The arc shaped portions 20 may reduce water flowing resistance at the respective zigzag corners while preventing stone-biting by reducing holding force to stones. Furthermore, the straight portions 21 may be useful to further reduce water flowing resistance by straightening water in the respective inclined portions 6a and 6b of the steep sloped portion 13.

In order to further improve the above effects, the arc shaped portions 20 formed on the internal corners 11 preferably have a radius of curvature R1 of 5 mm or more, further preferably 10 mm or more, but preferably 25 mm or less, further preferably 20 mm or less. When an arc shaped portion 20 is configured as an arc curve that includes a plurality of arcs having different radii, the radius of curvature is defined as the minimum radius of the arcs.

As illustrated in FIG. 3, each gentle sloped portion 14 in this embodiment extends from the outer end 13o of each steep sloped portion 13 to the tread ground-contact surface 2t in a straight shape to ensure sufficient groove volume. The gentle sloped portions 14 can reduce a contact area and holding force with respect to a small stone that is pinched therebetween. Accordingly, the drainage performance and anti stone-biting effect can be improved in good balance. The gentle sloped portions 14 are not limited to this embodiment, but may be modified as an arc shape that is concave or convex toward the groove centerline.

Figure 5A:
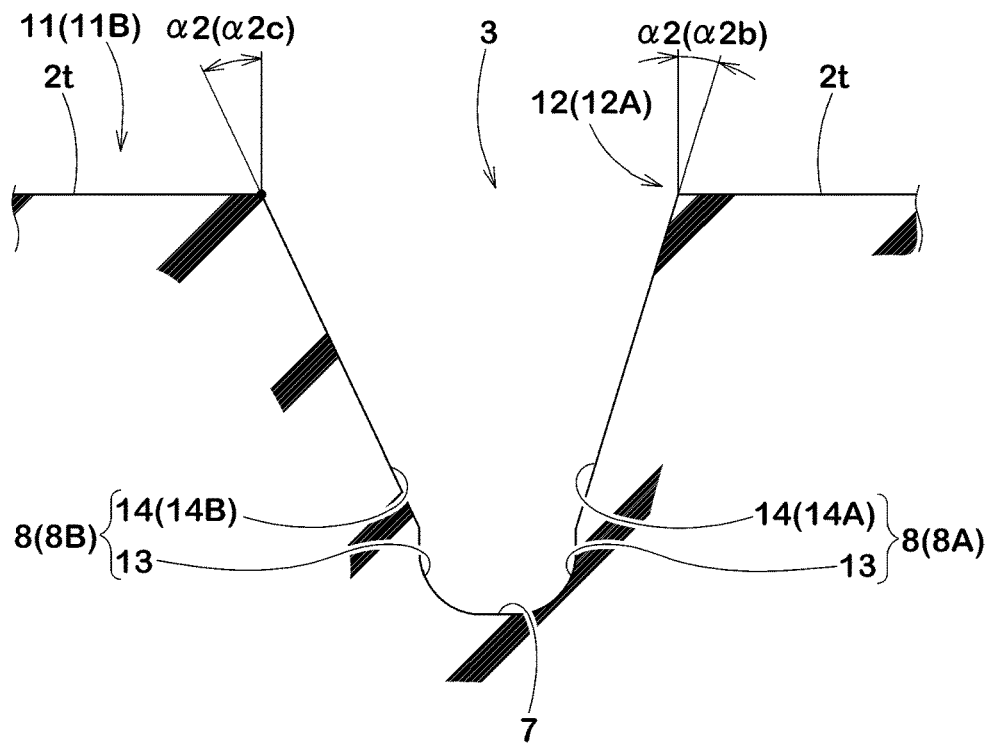
FIG. 5A is a cross-sectional view taken along lines C-C of FIG. 4.
Figure 5B:
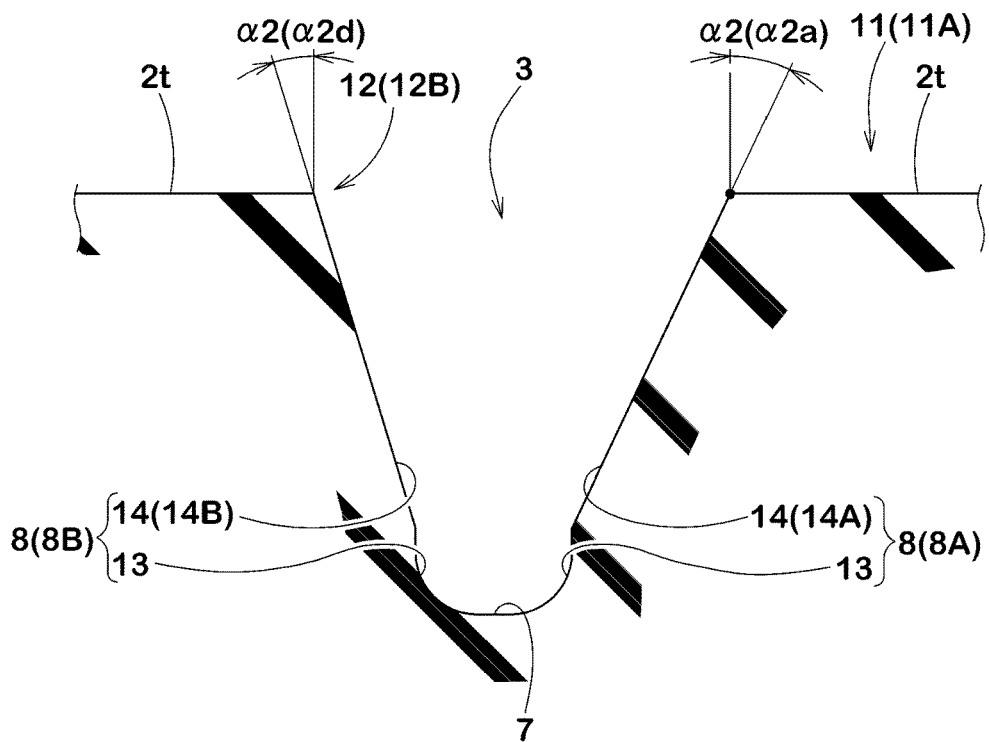
FIG. 5B is a cross-sectional view taken along lines D-D of FIG. 4.
Figure 6:
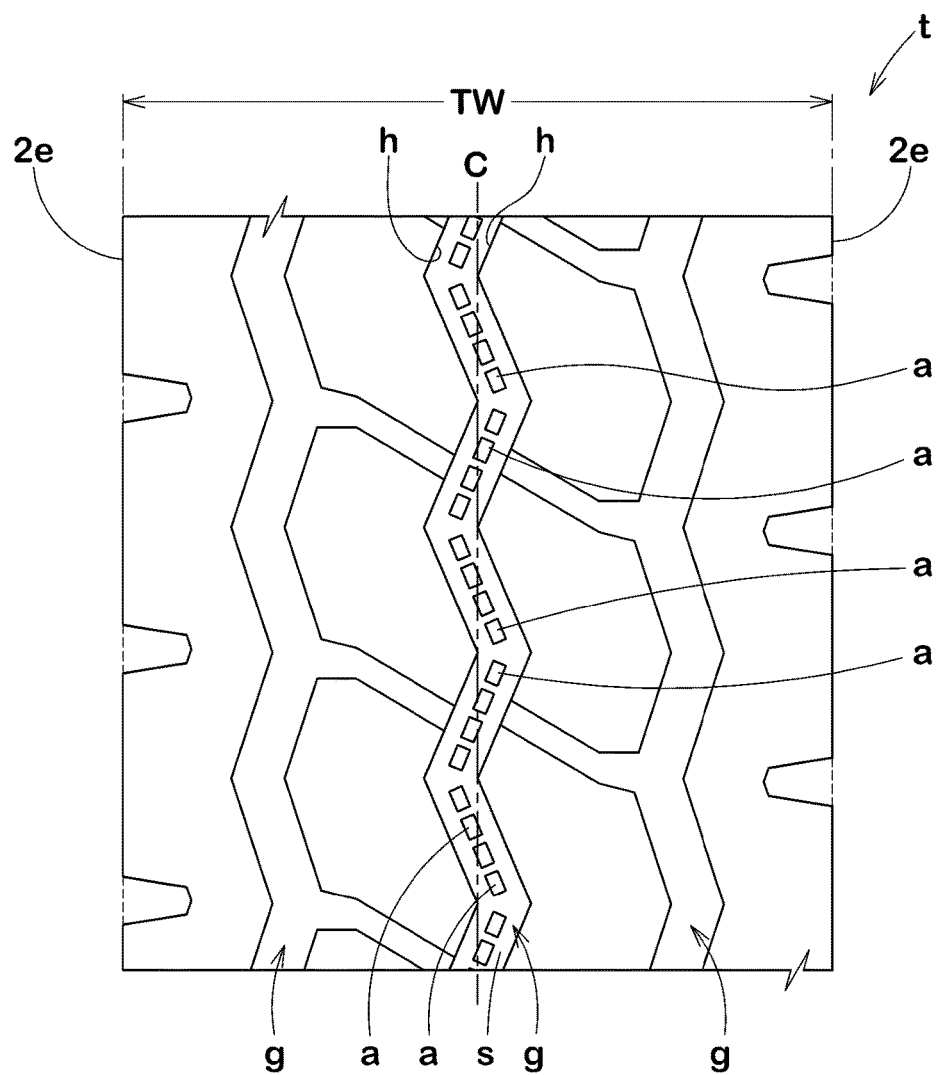
FIG. 6 is a development view of a tread portion of a conventional heavy duty pneumatic tire.

FIGS. 5A and 5B are cross-sectional views taken along lines C-C and lines D-D of FIG. 4, respectively. As illustrated in FIGS. 4, 5A and 5B, in the groove walls 8 according to the present embodiment, the angle α2 of the gentle sloped portions 14 decreases from the internal corners 11 toward the external corners 12. For example, in the right side gentle sloped portion 14A, the angle α2 varies so as to decrease from the angle α2a at the internal corners 11A to the angle α2b at the external corners 12A, wherein an angle transit portion 16A is formed on the gentle sloped portion 14A. Similarly, in the left side gentle sloped portion 14B, the angle α2c at the internal corners 11B to the angle α2d at the external corners 12B, wherein an angle transit portion 16B is formed on the gentle sloped portion 14B. Thus, the central main groove 3 provides the gentle sloped portions 14A and 14B facing with each other with different angles α2 which offer different contact area and holding force with respect to the stone pinched therebetween in the circumferential direction of the tire. Accordingly, the central main groove 3 can easily release the stone from the groove, and the tire according to the present invention can reduce stone-biting effectively. Furthermore, since the internal corners 11, which are located near the tire equator C and are subject to receiving large ground contact pressure as compared with the external corners 12, have the angle α2 greater than that of the external corners, a contact area and holding force with respect to a stone can be lowered so as to further reduce the stone-biting. In addition, a groove volume of the central main groove 3 can be maintained even when the angle α2 varies, and thus drainage performance of the tire can also be maintained.

In the respective angle transit portions 16A and 16B, the difference between the maximum angle α2 of one of the internal corners 11 and the minimum angle α2 of one of the external corners 12 is in a range of from 15 to 25 degrees. When the difference angle is more than 25 degrees, a ground contact area of the central land portion Rc may be lower to decrease traction. Furthermore, the anti stone-biting effect may be deteriorated because a contact area and holding force with respect to the stone that is pinched in the groove are increased. On the other hand, when the difference angle is less than 15 degrees, it would be difficult to offer different contact area and holding force between the gentle sloped portions 14A and 14B in the circumferential direction of the tire with respect to the stone pinched in the groove, and thus the anti stone-biting effect can also be deteriorated. In view of the above, the maximum angle of the gentle sloped portions 14 (i.e., the angles α2a and α2c) is preferably 15 degrees or more, further preferably 17 degrees or more, but preferably 35 degrees or less, further preferably 30 degrees or less. Furthermore, the minimum angle of the gentle sloped portions 14 (i.e., the angles α2b and α2d) is preferably 1 degree or more, further preferably 2 degrees or more, but preferably 10 degrees or less, further preferably 8 degrees or less.

Preferably, the angle transit portions 16A and 16B form over the entire region La between adjacent internal corner 11 and external corner 12. Alternatively, the angle transit portions 16A and 16B may form a part of the region La, preferably form at least 80% of the entire region La.

As illustrated in FIG. 1, the shoulder main grooves 4 are configured as zigzag grooves having a plurality of inclined elements 31 and corners 30. Generally, the shoulder main grooves do not contribute to traction performance so much as compared with the central main groove 3. Thus, a zigzag amplitude of the shoulder main groove 4 in accordance with the embodiment is smaller than that of the central main groove 3 to improve drainage performance as well as uneven wear resistance of the tire.

The central lateral grooves 9, in this embodiment, are in communication with the external corners 12 of the central main groove 3. At the junctions of the central main groove 3 and the respective central lateral grooves 9, the groove width of the central main groove 3 can substantially be enlarged so as to suppress the stone-biting more effectively. Furthermore, the configuration may further reduce water flowing resistance at the groove corners so that drainage performance improves. In addition, the central lateral grooves 9 may be useful to prevent uneven wear on the portions around the external corners 12. In this embodiment, each of the central lateral grooves 9 includes a narrow portion 9a having a groove width W3 of from about 2 to 12 mm and a pair of enlarged-width portions 9b and 9b each of which extends from each end of the narrow portion 9a to the central main groove 3 or one of the shoulder main grooves 4. This may maintain sufficient rigidity of the central land portion Rc while improving drainage performance of the tire.

An angle θ2 of the central lateral grooves 9 with respect to the axial direction of the tire is preferably 10 degrees or more, further preferably 20 degrees or more, but preferably 40 degrees or less, further preferably 30 degrees or less, in order to improve drainage performance during straight traveling ahead and cornering in good balance. Note that the angle θ2 is measured using an imaginary line 9n that passes middle points 9c of both openings of a central lateral groove 9 at the central main groove 3 and the shoulder main groove 4.

A groove depth D3 of the central lateral grooves 9, as shown in FIG. 2, is preferably 25% or more, further preferably 40% or more, but preferably 75% or less, further preferably 60% or less, relative to the groove depth D1 of the central main groove 3, in order to prevent a contact of a small stone with the bottom of the central main groove while ensuring drainage performance.

A circumferential distance Lb between an internal corner 11 and the middle point 9c of the opening at the central main grooves 3 of one of the central lateral grooves 9 is preferably 35% or more, further preferably 40% or more, but preferably 65% or less, further preferably 60% or less relative to one of the pitches P.

While the particularly preferable embodiments in accordance with the present invention have been described in detail, the present invention is not limited to the illustrated embodiments, but can be modified and carried out in various aspects.

Example

Tires having a basic tread pattern illustrated in FIG. 1 were manufactured based on the detail shown in Table 1, and then performance of each tire was tested. As for the comparative example 1 (Ref 1), a tire having protrusion for preventing stone-biting each of which includes a length of 6.5 mm, a width of 3.0 mm and a height of 3.5 mm was also tested. The common specification and the test method are as follows.

Tire:
Size: 11.00R20
Rim: 8.00×20
Internal pressure: 830 kPa
Tire load: maximum tire load of JATMA
Tread width TW: 226 mm
Central main groove:
Groove width W1: 16 mm
Groove depth D1: 17 mm
Angle α1 of steep sloped portion: 0 degrees
Shoulder main groove:
Groove width W2: 16 mm
Groove depth D2: 17 mm
Central lateral groove:
Groove width W3: 4 mm
Groove depth D3: 2 mm Anti Stone-Biting Performance Test:
Each test tire was installed to a 2-DD type truck (rear wheel drive) having a load capacity of 10t as all the wheel, and then was counted the number of stones pinched in the central main grooves of the rear wheels after running for 15,000 km on each public road and express road. The results are indicated as reciprocals of the number of stones using an index based on Ex. 1 being 100. The larger the value, the better the performance is.

Wear Resistance Test:
After the anti stone-biting performance test, the remaining depths of the central main grooves of rear wheels at eight positions equally divided in the circumferential direction of the tire were measured. The results are indicated as average depths using an index based on Ex. 1 being 100. The larger the value, the better the performance is.

Drainage Performance Test:
The truck was entered into a course with a water puddle of 5 mm deep and 20 m long, on an asphalt road surface with a radius of 100 m, with stepwise speed increase. Then, lateral acceleration (lateral G) of the truck was measured, and average lateral acceleration at speeds of 70 km/h, 80 km/h and 90 km/h was calculated. Calculation results are shown with an index of 100 representing a value in Ex. 1. The larger the values, the better the performance is.

The test results are shown in Table 1.

TABLE 1

| | Ref. 1 | Ex. 1 | Ref. 2 | Ex. 2 | Ex. 3 | Ref. 3 | Ex. 4 | Ref. 4 | Ex. 5 | Ex. 6 |
| --- | --- | --- | --- | --- | --- | --- | --- | --- | --- | --- |
| Minimum angle α2b of gentle sloped portion (deg.) | — | 10 | 10 | 10 | 10 | 10 | 15 | 20 | 10 | 10 |
| Maximum angle α2a of steep sloped portion (deg.) | — | 30 | 15 | 25 | 35 | 40 | 30 | 30 | 30 | 30 |
| Steep sloped portion height Hs/D1 (%) | — | 20 | 20 | 20 | 20 | 20 | 20 | 20 | 10 | 35 |
| Steep sloped portion groove width Ws/Hs (%) | — | 169 | 293 | 202 | 120 | 65 | 133 | 94 | 131 | 226 |

TABLE 1-continued

|  | Ref. 1 | Ex. 1 | Ref. 2 | Ex. 2 | Ex. 3 | Ref. 3 | Ex. 4 | Ref. 4 | Ex. 5 | Ex. 6 |
| --- | --- | --- | --- | --- | --- | --- | --- | --- | --- | --- |
| Distance between internal corner and central lateral groove Lb/P (%) | — | 50 | 50 | 50 | 50 | 50 | 50 | 50 | 50 | 50 |
| Central lateral groove angle θ2 (deg.) | 25 | 25 | 25 | 25 | 25 | 25 | 25 | 25 | 25 | 25 |
| Central lateral groove depth D3/D1 (%) | 50 | 50 | 50 | 50 | 50 | 50 | 50 | 50 | 50 | 50 |
| Anti stone-biting performance (index) | 95 | 100 | 85 | 100 | 100 | 93 | 95 | 88 | 93 | 92 |
| Wear resistance performance (index) | 100 | 100 | 95 | 98 | 105 | 107 | 102 | 105 | 105 | 100 |
| drainage performance (index) | 80 | 100 | 105 | 101 | 93 | 85 | 97 | 90 | 95 | 100 |

From the test results, it was confirmed that the example tires reduced the stone-biting while maintaining the drainage performance. Furthermore, in another test where the angle $\alpha 1$ of the steep sloped portions was changed from 0 to 10 degrees at 2 degrees intervals, the same results were confirmed. Although another test with respect to tires with the angle $\alpha 1$ of −1 degrees and 11 degrees were also tested, poor results were obtained.

What is claimed is:

1. A heavy duty pneumatic tire comprising:
   a tread portion comprising a central region having a 10% width of a tread width centered on a tire equator, the central region being provided with a circumferentially and continuously extending zigzag central main groove having a pair of groove edges each circumferentially extending in a zigzag manner on a tread ground-contact surface of the tread portion, the central main groove having an amplitude center of a zigzag centerline thereof being located in the central region and having zigzag pitches of from 40 to 50, wherein each of the zigzag pitches is a repetition pattern of zigzag;
   the central main groove comprising a bottom and a pair of groove walls;
   each groove wall comprising a bottom side steep sloped portion and a top side gentle sloped portion;
   the steep sloped portion comprising a height of from 10% to 35% of a groove depth of the central main groove from the bottom and an angle of from 0 to 10 degrees with respect to a tire normal line of the tread ground-contact surface;
   the gentle sloped portion extending from the steep sloped portion toward the tread ground-contact surface with an angle greater than that of the steep sloped portion;
   the central main groove having a groove width of from 4.0 to 12.0 mm between the steep sloped portions; and
   each groove wall comprising an internal corner protruding in an axial direction of the tire toward a groove centerline of the central main groove and an external corner protruding in the axial direction of the tire in an opposite direction to the center line, the angle of the gentle sloped portion decreasing in a range of from 15 to 25 degrees from the internal corner toward the external corner.
2. The heavy duty pneumatic tire according to claim 1, wherein the groove width between the steep sloped portions is in a range of from 50% to 200% of the height of the steep sloped portion.
3. The heavy duty pneumatic tire according to claim 1, wherein the steep sloped portion comprises a top edge comprising arc shaped portions formed on the internal corner and the external corner, and a straight shaped portion connecting the arc shaped portions.
4. The heavy duty pneumatic tire according to claim 1, wherein the tread portion is further provided with a central lateral groove extending from the external corner of the central main groove toward a tread edge with an angle of from 10 to 40 degrees with respect to an axial direction of the tire.
5. The heavy duty pneumatic tire according to claim 4, wherein the tread portion is further provided with a circumferentially and continuously extending shoulder main groove adjacent to the central main groove, and the central lateral groove is in communication with the shoulder main groove.
6. The heavy duty pneumatic tire according to claim 1, wherein the central main groove extends on the tire equator.
7. The heavy duty pneumatic tire according to claim 4, wherein the central lateral groove is in communication with the external corner of the central main groove.
8. The heavy duty pneumatic tire according to claim 1, wherein
   a maximum angle of the gentle sloped portion is in a range of from 15 to 35 degrees with respect to a tire normal line perpendicular to the tread ground-contact surface passing a corner between the gentle sloped portion and the tread ground-contact surface, and
   a minimum angle of the gentle sloped portion is in a range of from 1 to 10 degrees with respect to the tire normal line.

* * * * *